(12) United States Patent
Huang et al.

(10) Patent No.: US 7,439,647 B2
(45) Date of Patent: Oct. 21, 2008

(54) BRUSHLESS DC MOTOR AND STATOR THEREOF

(75) Inventors: Shih-Wei Huang, Taoyuan Hsien (TW); Lee-Long Chen, Taoyuan Hsien (TW); Shih-Ming Huang, Taoyuan Hsien (TW); Wen-Shi Huang, Taoyuan Hsien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 406 days.

(21) Appl. No.: 11/369,865

(22) Filed: Mar. 8, 2006

(65) Prior Publication Data

US 2007/0052306 A1 Mar. 8, 2007

(30) Foreign Application Priority Data

Sep. 2, 2005 (TW) .............................. 94130065 A

(51) Int. Cl.
*H02K 1/12* (2006.01)
*H02K 7/00* (2006.01)
(52) U.S. Cl. .................................... 310/257; 310/67 R
(58) Field of Classification Search ............... 310/49 R, 310/67 R, 216, 257; 360/97.08, 98.07–98.08, 360/99.05–99.08, 99.12
See application file for complete search history.

(56) References Cited

U.S. PATENT DOCUMENTS

| 6,538,357 | B2 * | 3/2003 | Horng et al. | ................. 310/257 |
| 6,700,294 | B2 * | 3/2004 | Horng et al. | ................. 310/259 |
| 6,759,786 | B2 * | 7/2004 | Horng et al. | ................. 310/257 |
| 6,853,101 | B2 * | 2/2005 | Lin et al. | ................... 310/49 R |
| 6,982,505 | B2 * | 1/2006 | Horng et al. | ................... 310/51 |

* cited by examiner

*Primary Examiner*—Tran Nguyen
(74) *Attorney, Agent, or Firm*—Birch, Stewart, Kolasch & Birch, LLP

(57) ABSTRACT

A brushless DC motor and a stator thereof. The stator comprises an upper magnetic pole piece and a lower magnetic pole piece. The upper magnetic pole piece comprises a plurality of upper protruding portions extending toward the lower magnetic pole piece, and the lower magnetic pole piece comprises a plurality of lower protruding portions extending toward the upper magnetic pole piece. The upper protruding portions and the lower protruding portions are substantially spaced apart and alternately arranged. A positioning portion extending from a distal end of each upper protruding portion is located below the magnetic ring of the rotor, to increase the magnetic force therebetween. Alternatively, a positioning portion can be formed between the lower protruding portions of the lower magnetic pole piece and extended to the bottom of the rotor; thus, an axial attraction force can be generated to stabilize the rotor.

20 Claims, 4 Drawing Sheets

BRUSHLESS DC MOTOR AND STATOR THEREOF

BACKGROUND

The invention relates to a brushless DC motor and a stator thereof, and in particular to a brushless DC motor and a stator thereof for stabilizing rotation and increasing rotation power of a rotor.

A disclosed stator structure for a brushless DC motor includes a lower magnetic pole piece having leg portions radially extending from the magnetic pole of the lower magnetic pole piece. Each of the leg portions supports a ring sheet. The ring sheets are used to interact with a permanent magnet of a rotor to generate attraction therebetween to stabilize the rotation of the rotor. Although slanting, vibration, undesirable friction and noise from the shaft of the rotor can be eliminated by this stator structure, axial attraction may hinder the rotation of the rotor. Further, because only increasing the number of the stacked magnetic pole pieces can improve the performance efficiency of the motor, the usable space in the motor is limited, especially in a miniature motor.

Also, there is a conventional brushless DC motor having an outer rotor and a plurality of upper and lower magnetic pole pieces correspondingly bent and complementarily arranged to increase the effective magnetic area. However, vibration in the axial direction of the rotor can not avoid.

Thus, to overcome the disclosed problems, the invention provides a miniature brushless DC motor to rapidly enhance rotation speed and effectively stabilize the rotation thereof.

SUMMARY

The invention provides a brushless DC motor and a stator thereof. The stator comprises an upper magnetic pole piece and a lower magnetic pole piece. The upper magnetic pole piece comprises a plurality of upper protruding portions extending toward the lower magnetic pole piece, and the lower magnetic pole piece comprises a plurality of lower protruding portions extending toward the upper magnetic pole piece. The upper protruding portions and the lower protruding portions are substantially spaced apart and alternately arranged. A positioning portion extends from a distal end of each upper protruding portion and the positioning portion is located below a magnetic ring of a rotor, to increase the magnetic force therebetween. Alternatively, a positioning portion can be formed between the lower protruding portions of the lower magnetic pole piece and extended to the bottom of the rotor; thus, an axial attraction force can be generated to stabilize the rotor.

A brushless DC motor of the invention comprises a rotor and a stator. The rotor comprises a magnetic ring. The stator comprises a magnetically conductive sleeve, a coil circumferentially disposed around the magnetically conductive sleeve, and a magnetic pole assembly comprising an upper magnetic pole piece and a lower magnetic pole piece respectively disposed on two ends of the magnetically conductive sleeve. The upper magnetic pole piece comprises a plurality of upper protruding portions extending toward the lower magnetic pole piece, and the lower magnetic pole piece comprises a plurality of lower protruding portions extending toward the upper magnetic pole piece. The upper protruding portions and the lower protruding portions are substantially spaced apart and alternately arranged. A plurality of positioning portions radially extends from the lower magnetic pole piece. Each of the positioning portions comprises a supporting leg extending between two adjacent lower protruding portions of the lower magnetic pole piece and a positioning ring disposed on a distal end of the supporting leg. The distal end of the supporting leg is located on the different level from that of the lower magnetic pole piece so the positioning ring is located under the magnetic ring of the rotor. When the motor is operated, an axial attraction force can be generated between the magnetic ring and the positioning ring to stabilize the rotor.

Otherwise, the brushless DC motor of the invention is modified to comprise an upper magnetic pole piece having a plurality of axially extended upper protruding portions and a plurality of positioning portions extending outwardly from distal ends of the upper protruding portions, and a lower magnetic pole piece having a plurality of axially extended lower protruding portions, wherein the upper protruding portions and the lower protruding portions are substantially spaced apart and alternately arranged. The positioning portions of the upper magnetic pole piece increase an effective magnetic area; thus, an additional repulsive force can be generated to increase the output power of the rotor.

The brushless DC motor further comprises a seat for fixedly supporting the stator disposed outside thereof, and a bearing disposed on a inner side of the seat. The rotor with an opening comprises a magnetic ring peripherally disposed on the inner wall thereof, and a shaft centrally disposed on the rotor and extending to the stator. The bearing is to support the shaft.

DESCRIPTION OF THE DRAWINGS

The invention can be more fully understood by reading the subsequent detailed description and examples with references made to the accompanying drawings, wherein.

DETAILED DESCRIPTION

Figure 1:
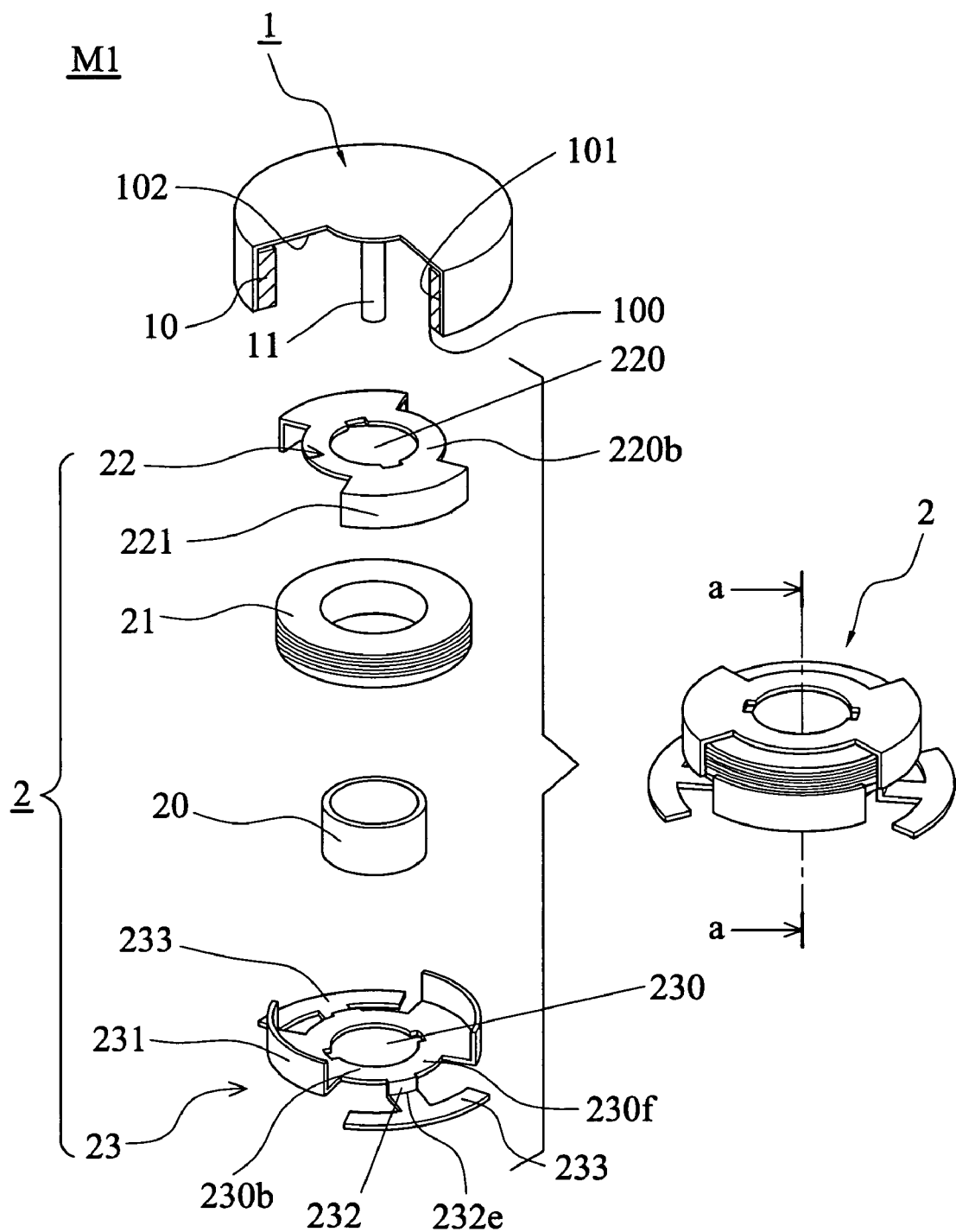
FIG. 1 is an exploded perspective view of a brushless DC motor with a stator of a first embodiment of the invention.
Figure 2:
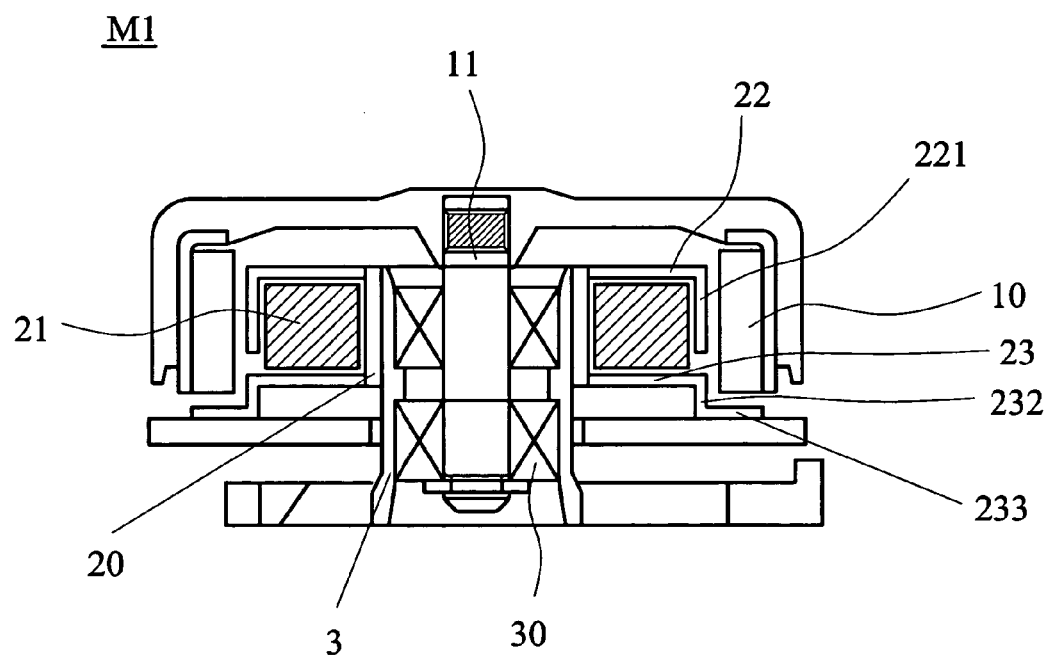
FIG. 2 is a sectional view of the brushless DC motor along line (a-a) of FIG. 1.

In FIGS. 1 and 2, a brushless DC motor M1 of the first embodiment of the invention comprises a cylindrical rotor 1 with an opening 100, a stator 2 coupled to the rotor 1, a seat 3 to fixedly support the stator 2, and a bearing 30 disposed on an inner side of the seat 3. With the stator 2, the brushless DC motor M1 can be magnetically balanced and positioned.

The rotor 1 comprises an inner wall 101 connected to the opening 100, a bottom 102, a magnetic ring 10 disposed on the inner wall 101, and a shaft 11 centrally disposed on the bottom 102. The bearing 30 supports the shaft 11 and the stator 2 is disposed outside of the seat 3.

The stator 2 comprises a magnetically conductive sleeve 20, a coil 21 circumferentially disposed around the magnetically conductive sleeve 20, and a magnetic pole assembly comprising an upper magnetic pole piece 22 and a lower magnetic pole piece 23, respectively located at both sides of the coil 21. The upper and lower magnetic pole pieces 22 and 23 are respectively disposed on two ends of the magnetically conductive sleeve 20, magnetically functioning with the magnetic ring 10. In this embodiment, the upper and lower magnetic pole pieces 22 and 23 are made of magnetically conductive material. Preferably, the upper and lower magnetic pole pieces 22 and 23 are made of silicon-steel sheets. The magnetically conductive sleeve 20 can be formed by lathing, turning or rolling.

The upper magnetic pole piece 22 comprises a body 220b, a axial hole 220 formed in the body 220b, and a plurality of upper protruding portions 221 connected to the body 220b and extending toward the lower magnetic pole piece 23 (as shown in FIG. 1). The lower magnetic pole piece 23 comprises a body 230b having a plane 230f, a axial hole 230 formed in the body 230b, a plurality of spaced lower protruding portions 231 connected to the body 230b and circumferentially extending toward the upper magnetic pole piece 22 (as shown in FIG. 1), a plurality of supporting legs 232 extending between two adjacent lower protruding portions 231, and a positioning ring 233 disposed on a distal end 232e of each supporting leg 232. The distal end 232e of the supporting leg 232 is not located on the same level as a plane 230f of the body 230b. The axial holes 220 and 230 of the upper and lower magnetic pole pieces 22 and 23 allow the shaft 11 and the seat 3 to pass through.

When the rotor 1, the stator 2 and the seat 3 are assembled, the positioning ring 233 is located below the magnetic ring 10 of the rotor 1. The upper protruding portion 221 and the lower protruding portion 231 are substantially spaced apart and alternately arranged.

The lower protruding portions 231, the supporting legs 232 and the positioning ring 233 of the lower magnetic pole piece 23 are integrally formed by pressing and bending, as well as the upper protruding portions 231 and the upper magnetic pole piece 22.

When the stator 2 is magnetically energized, the upper and lower magnetic pole pieces 22 and 23 respectively generates opposite magnetic poles. The upper magnetic pole piece 22 and the upper protruding portions 221 have the same magnetic pole as the corresponding areas of the magnetic ring 10, so as to generate a repulsive force to drive the rotor 1 to rotate in a predetermined direction. Meanwhile, another repulsive force, generated between the lower magnetic pole piece 23, the lower protruding portion 231 and the corresponding areas of the magnetic ring 10, drives the rotor 1 to rotate in the same predetermined direction. Because the positioning rings 233 of the lower magnetic pole pieces 23 are provided with the opposite magnetic pole to that of the corresponding areas of the magnetic ring 10, an attraction force can be generated therebetween to stabilize the rotation of the stator 2.

Figure 3:
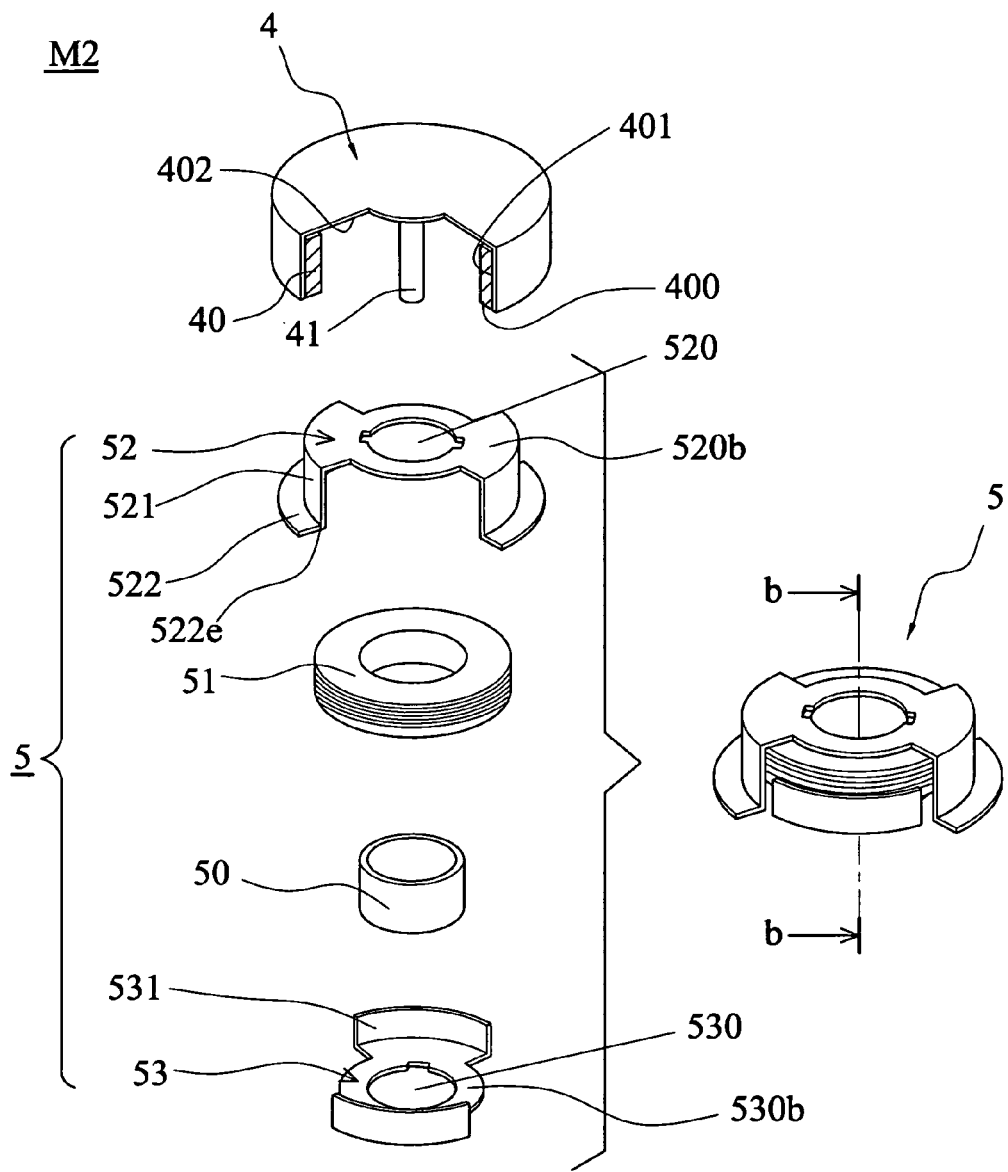
FIG. 3 is an exploded perspective view of a brushless DC motor with a stator of a second embodiment of the invention.
Figure 4:
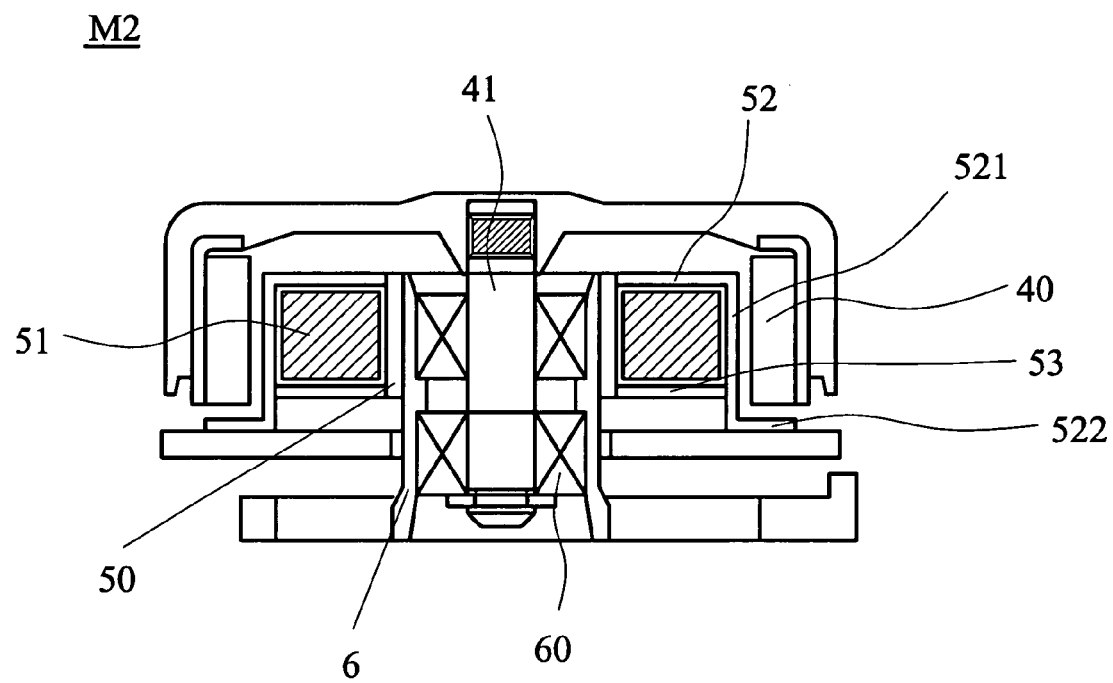
FIG. 4 is a sectional view of the brushless DC motor along line (b-b) of FIG. 3.

In FIGS. 3 and 4, a brushless DC motor M2 of the second embodiment of the invention comprises a rotor 4 with an opening 400, a stator 5 coupled to the rotor 4, a seat 6 to fixedly support the stator 5, and a bearing 60 disposed on an inner side of the seat 6.

The rotor 4 comprises an inner wall 401 connected to the opening 400, a bottom 402, a magnetic ring 40 disposed on the inner wall 401, and a shaft 41 centrally disposed on the bottom 402. The bearing 60 supports the shaft 41 and the stator 5 is disposed outside of the seat 6.

The stator 5 comprises a hollow magnetically conductive sleeve 50, a coil 51 circumferentially disposed around the magnetically conductive sleeve 50, and a magnetic pole assembly comprising a upper magnetic pole piece 52 and a lower magnetic pole piece 53 located at both sides of the coil 51. The upper and lower magnetic pole pieces 52 and 53 are respectively disposed on two ends of the magnetically conductive sleeve 50 to magnetically function with the magnetic ring 40. In this embodiment, the upper and lower magnetic pole pieces 52 and 23 are made of magnetically conductive material. Preferably, the upper and lower magnetic pole pieces 52 and 23 are made of silicon-steel sheets. The magnetically conductive sleeve 50 can be formed by lathing, turning or rolling.

The upper magnetic pole piece 52 comprises a body 520b, a axial hole 520 formed in the body 520b, a plurality of upper protruding portions 521 connected to the body 520b and extending toward the lower magnetic pole piece 53 (as shown in FIG. 3), and a plurality of positioning portions 522 radially extending from a distal end 522e of the upper protruding portion 521.

The lower magnetic pole piece 53 comprises a body 530b, a axial hole 530 formed in the body 530b, a plurality of spaced lower protruding portions 531 connected to the body 530b and circumferentially extending toward the upper magnetic pole piece 52 (as shown in FIG. 3). The upper protruding portions 521 of the upper magnetic pole piece 52 and the lower protruding portions 531 of the lower magnetic pole piece 53 are substantially spaced apart and alternately arranged. The axial holes 520 and 530 of the upper and lower magnetic pole pieces 52 and 53 allow the shaft 41 and the seat 6 to pass through.

When the rotor 4, the stator 5 and the seat 6 are assembled, the positioning portions 522 are located below the magnetic ring 40 of the rotor 4.

The upper protruding portions 521 and the positioning portions 522 of the upper magnetic pole piece 52 are integrally formed by pressing and bending as well as the lower protruding portions 531 and the lower magnetic pole piece 53.

When the stator 5 is magnetically energized, the upper and lower magnetic pole pieces 52 and 53 respectively generate opposite magnetic poles. The upper magnetic pole piece 52, the upper protruding portions 521 and the positioning portions 522 have the same magnetic pole opposite to that of the corresponding area of the magnetic ring 40 so as to generate a repulsive force to drive the rotor 4 to rotate in a predetermined direction. Meanwhile, another repulsive force, generated between the lower magnetic pole piece 53, the lower protruding portions 531 and the corresponding magnetic ring 40, drives the rotor 4 to rotate in the same predetermined direction. Note that the positioning portions 522 of the upper magnetic pole piece 52 increases the effective magnetic area; thus, an additional repulsive force can be generated to increase the output power of the rotor 4.

While the invention has been described with respect to preferred embodiment, it is to be understood that the invention is not limited thereto, but, on the contrary, is intended to accommodate various modifications and equivalent arrangements included within the spirit and scope of the appended claims.

What is claimed is:

1. A brushless DC motor, comprising:
a rotor comprising a magnetic ring; and
a stator comprising a magnetically conductive sleeve, a coil circumferentially disposed around the magnetically conductive sleeve, and a magnetic pole assembly comprising a first magnetic pole piece and a second magnetic pole piece disposed on two ends of the magnetically conductive sleeve respectively, wherein the first magnetic pole piece comprises a plurality of first protruding portions extending toward the second magnetic pole piece, and the second magnetic pole piece comprises a plurality of second protruding portions extending toward the first magnetic pole piece, wherein one of the first and second magnetic pole pieces comprises at least one positioning portion corresponding to the magnetic ring of the rotor.

2. The brushless DC motor as claimed in claim 1, wherein the first protruding portions and the second protruding portions are substantially spaced apart and alternately arranged.

3. The brushless DC motor as claimed in claim 1, wherein the at least one positioning portion radially extends from a distal end of the first protruding portion of the first magnetic pole piece.

4. The brushless DC motor as claimed in claim 1, wherein the positioning portion comprises a supporting leg positioned between two adjacent second protruding portions of the second magnetic pole piece and a positioning ring disposed on a distal end of the supporting leg.

5. The brushless DC motor as claimed in claim 4, wherein the distal end of the supporting leg is located on the different level from that of the second magnetic pole piece.

6. The brushless DC motor as claimed in claim 1, wherein the first and second magnetic pole pieces are made of magnetically conductive material or a silicon sheet.

7. The brushless DC motor as claimed in claim 6, wherein the magnetically conductive sleeve is formed by lathing, turning or rolling.

8. The brushless DC motor as claimed in claim 1, wherein the first and second magnetic pole piece respectively comprises an axial hole, the rotor further comprises a shaft passing through the axial holes of the first and second magnetic pole pieces.

9. The brushless DC motor as claimed in claim 8 further comprising a seat and a bearing disposed on an inner side of the seat, wherein the bearing supports the shaft and the stator is disposed outside of the seat.

10. The brushless DC motor as claimed in claim 1, wherein the first protruding portions of the first magnetic pole piece, the second protruding portions of the second magnetic pole piece and the positioning portion are integrally formed by pressing and bending.

11. A stator of a brushless DC motor, comprising:
a first magnetic pole piece comprising a plurality of axially extended first protruding portions and a plurality of positioning portions extending outwardly from distal ends of the first protruding portions;
a second magnetic pole piece comprising a plurality of axially extended second protruding portions, wherein the first protruding portions and the second protruding portions are substantially spaced apart and alternately arranged;
a magnetically conductive sleeve having two ends connected to the first and second magnetic pole pieces respectively; and
a coil circumferentially disposed around the magnetically conductive sleeve.

12. The stator of the brushless DC motor as claimed in claim 11, wherein the positioning portions are disposed on one end of the stator.

13. The stator of the brushless DC motor as claimed in claim 11, wherein the first magnetic pole piece, the second magnetic pole piece and the magnetically conductive sleeve are made of magnetically conductive material or a silicon sheet.

14. The stator of the brushless DC motor as claimed in claim 11, wherein the first protruding portions of the first magnetic pole piece, the second protruding portions of the second magnetic pole piece and the positioning portion are integrally formed by pressing and bending.

15. A stator of a brushless DC motor, comprising:
a first magnetic pole piece comprising a plurality of first protruding portions and positioning portions, wherein the first protruding portions and the positioning portions are spaced apart from each other on a circumference of the first magnetic pole piece, wherein the first protruding portions are axially extended and the positioning portions are extended from one end of the stator;
a second magnetic pole piece comprising a plurality of axially extended second protruding portions, wherein the first protruding portions and the second protruding portions are substantially spaced apart and alternately arranged;
a magnetically conductive sleeve having two ends connected to the first and second magnetic pole pieces respectively; and
a coil circumferentially disposed around the magnetically conductive sleeve.

16. The stator of the brushless DC motor as claimed in claim 15, wherein the positioning portion comprises a supporting leg extending from the first magnetic pole piece and a positioning ring extending from a distal end of the supporting leg.

17. The stator of the brushless DC motor as claimed in claim 16, wherein the distal end of the supporting leg is located at a different plane from that of the first magnetic pole piece.

18. The stator of the brushless DC motor as claimed in claim 15, wherein the first magnetic pole piece, the second magnetic pole piece and the magnetically conductive sleeve are made of magnetically conductive material or a silicon sheet.

19. The stator of the brushless DC motor as claimed in claim 15, wherein the first protruding portions of the first magnetic pole piece, the second protruding portions of the second magnetic pole piece and the positioning portions are integrally formed by pressing and bending.

20. The stator of the brushless DC motor as claimed in claim 15, wherein the first magnetic pole piece comprises a axial hole and the second magnetic pole piece comprises a axial hole axially corresponding to the axial hole of the first magnetic pole piece.

* * * * *